United States Patent
Chen et al.

(10) Patent No.: US 10,812,524 B2
(45) Date of Patent: Oct. 20, 2020

(54) METHOD, AND DEVICES FOR DEFENDING DISTRIBUTED DENIAL OF SERVICE ATTACK

(71) Applicants: NSFOCUS INFORMATION TECHNOLOGY CO., LTD., Beijing (CN); NSFOCUS TECHNOLOGIES, INC., Beijing (CN)

(72) Inventors: Tao Chen, Beijing (CN); Kun He, Beijing (CN)

(73) Assignees: NSFOCUS INFORMATION TECHNOLOGY CO., LTD., Beijing (CN); NSFOCUS TECHNOLOGIES, INC., Beijing (CN)

(*) Notice: Subject to any disclaimer, the term of this patent is extended or adjusted under 35 U.S.C. 154(b) by 160 days.

(21) Appl. No.: 16/024,073

(22) Filed: Jun. 29, 2018

(65) Prior Publication Data

US 2018/0309784 A1 Oct. 25, 2018

Related U.S. Application Data

(63) Continuation of application No. PCT/CN2016/110159, filed on Dec. 15, 2016.

(30) Foreign Application Priority Data

Dec. 30, 2015 (CN) .......................... 2015 1 1021292

(51) Int. Cl.
  *H04L 29/06* (2006.01)
(52) U.S. Cl.
  CPC ...... *H04L 63/1458* (2013.01); *H04L 63/0263* (2013.01); *H04L 63/0435* (2013.01);
  (Continued)

(58) Field of Classification Search
  CPC . H04L 63/1458; H04L 63/0263; H04L 69/22; H04L 63/0435; H04L 63/1416;
  (Continued)

(56) References Cited

U.S. PATENT DOCUMENTS 7,958,549 B2 * 6/2011 Nakae ................... H04L 63/101
  726/11
8,781,442 B1 7/2014 Link, II
  (Continued)

FOREIGN PATENT DOCUMENTS

CN    101420433 A    4/2009
CN    104079408 A    10/2014
  (Continued)

OTHER PUBLICATIONS

International Search Report for International Patent Application No. PCT/CN2016/110159, dated Mar. 27, 2017.

*Primary Examiner* — Abu S Sholeman

(57) ABSTRACT

The present disclosure provides a method and devices for defending against distributed denial of service attacks. The method comprises: intercepting, by a defending device, a service message transmitted by a client to a server; obtaining, by the defending device, information carried in a first preset field of the service message and information carried in a second preset field of the service message according to a rule agreed on with the client; processing, by the defending device, the information carried in the second preset field and a preset key according to a hash algorithm agreed on with the client, and obtaining a hash value; and discarding, by the defending device, the service message upon determining that the hash value is different from the information carried in the first preset field.

11 Claims, 8 Drawing Sheets

(52) U.S. Cl.
CPC .......... *H04L 63/1416* (2013.01); *H04L 69/22* (2013.01); *H04L 63/0245* (2013.01); *H04L 2463/121* (2013.01)

(58) Field of Classification Search
CPC ........... H04L 63/0245; H04L 2463/121; H04L 63/1433
See application file for complete search history.

(56) References Cited

U.S. PATENT DOCUMENTS

| | | | |
|---|---|---|---|
| 8,898,263 B2 * | 11/2014 | Bharadwaj Subramanya | ............. H04L 12/6418 709/220 |
| 10,630,574 B2 * | 4/2020 | Chen | ...................... G06F 16/955 |
| 2004/0172557 A1 * | 9/2004 | Nakae | ................. H04L 63/0263 726/22 |
| 2005/0265349 A1 * | 12/2005 | Garg | ................. H04L 29/06027 370/395.2 |
| 2006/0053439 A1 * | 3/2006 | Sprunk | .............. H04N 21/4623 725/25 |
| 2007/0185998 A1 * | 8/2007 | Touitou | ............... H04L 63/1458 709/227 |
| 2008/0295175 A1 | 11/2008 | Ansari et al. | |
| 2009/0022213 A1 * | 1/2009 | Shi | ........................ H04L 1/0002 375/219 |
| 2009/0094411 A1 * | 4/2009 | Que | ...................... G06F 13/385 711/103 |
| 2009/0138712 A1 * | 5/2009 | Driscoll | .................... H04L 9/12 713/170 |
| 2011/0099622 A1 | 4/2011 | Lee et al. | |
| 2014/0074956 A1 * | 3/2014 | Lian | ........................ H04L 51/02 709/206 |
| 2015/0295950 A1 * | 10/2015 | Chen | ................... H04L 12/6418 726/13 |
| 2017/0325129 A1 * | 11/2017 | Zhu | ........................ H04L 47/11 |
| 2019/0199505 A1 * | 6/2019 | Zhang | .................. H04L 7/0054 |

FOREIGN PATENT DOCUMENTS

| | | |
|---|---|---|
| CN | 104917765 A | 9/2015 |
| CN | 105491060 A | 4/2016 |
| JP | H09252323 A | 9/1997 |
| JP | 2005506000 A | 2/2005 |
| JP | 2005159683 A | 6/2005 |
| JP | 2006072970 A | 3/2006 |
| JP | 2011205572 A | 10/2011 |

\* cited by examiner

METHOD, AND DEVICES FOR DEFENDING DISTRIBUTED DENIAL OF SERVICE ATTACK

CROSS REFERENCE

This application is a by-pass continuation of International Application No. PCT/CN2016/110159 filed on Dec. 15, 2016, which claims the benefit and priority of Chinese Patent Application No. 201511021292.8, filed with the Chinese Patent Office on Dec. 30, 2015. The entire disclosures of the above applications are incorporated herein by reference.

FIELD

The present disclosure relates to the field of network security, and particularly to a method and devices for defending against distributed denial of service attacks.

BACKGROUND

Distributed Denial of Service (DDOS) attacks are commonly seen attacks on servers. An attacker controls a large number of puppets (attacking clients) to initiate a large number of service messages to the server being attacked, thereby occupying resources of the server and making it unable to serve a normal client well.

The DDOS attacks are conventionally defended against by intercepting service messages transmitted by the normal client; analyzing characteristics of the service messages transmitted by the normal client automatically through statistics and machine learning; converting the characteristics of the service messages into keywords; forwarding received service messages to the server upon determining that the service messages carry the keywords; and discarding received service messages upon determining that the service messages do not carry the keywords, thus defending against the DDOS attacks.

However, as the kinds of network services vary, and each kind of service corresponds to one kind of service message, it may be highly complex to defend against the DDOS attacks by analyzing characteristics of the service messages automatically through statistics and machine learning. Moreover, when characteristics of some service messages are not obvious, it might be inaccurate to analyze characteristics of such service messages automatically through statistics and machine learning, causing normal messages to be discarded.

SUMMARY

The disclosure provides a method and devices for defending against distributed denial of service attacks.

In a first aspect, a method for defending against distributed denial of service attacks is provided. The method includes: intercepting, by a defending device, a service message transmitted by a client to a server; obtaining, by the defending device, information carried in a first preset field of the service message and information carried in a second preset field of the service message according to a rule agreed on with the client; processing, by the defending device, the information carried in the second preset field and a preset key according to a hash algorithm agreed on with the client, and obtaining a hash value; and discarding, by the defending device, the service message upon determining that the hash value is different from the information carried in the first preset field.

In connection with the first aspect, in a first possible implementation, the information carried in the first preset field is a hash value obtained by the client by processing the information carried in the second preset field and the preset key according to the hash algorithm, and the second preset field is a field composed of a preset quantity of bytes in a payload area of the service message.

In connection with the first possible implementation of the first aspect, in a second possible implementation, the method further includes: obtaining, by the defending device, additional information carried in a third preset field of the service message according to the rule agreed on with the client, where the additional information is a difference between time when the client transmits the service message and a standard time; and selecting, by the defending device, the preset quantity of bytes in the payload area of the service message by: calculating, by the defending device, a remainder of the difference divided by a length of the payload area; determining, by the defending device, whether a sum of the remainder and the preset number is more than the length of the payload area; and when the sum of the remainder and the preset number is more than the length of the payload area, selecting, by the defending device, the preset quantity of bytes starting from a start position of the payload area; or when the sum of the remainder and the preset number is equal to or less than the length of the payload area, making, by the defending device, an offset from the start position of the payload area by a plurality of bytes, the quantity of which is the remainder, and selecting the preset quantity of bytes starting from the offset position.

In connection with the second possible implementation of the first aspect, in a third possible implementation, the method includes: subtracting, by the defending device, a difference in a preceding service message transmitted by the client from the difference in the service message to obtain a temporal difference upon determining that the hash value is the same as the information carried in the first preset field; determining, by the defending device, whether the temporal difference lies in a preset range; and when the temporal difference lies in the preset range, forwarding, by the defending device, the service message to the server; or when the temporal difference does not lie in the preset range, discarding, by the defending device, the service message.

In connection with the first aspect, in a fourth possible implementation, processing, by the defending device, the information carried in the second preset field and the preset key according to the hash algorithm agreed on with the client, and obtaining the hash value includes: determining, by the defending device, a result of a logical XOR operation on the information carried in the second preset field and the preset key as the hash value. A length of the second preset field is two bytes, and a length of the preset key is two bytes.

In a second aspect, the method further includes: processing, by the client, the information carried in the second preset field of the service message and the preset key according to the hash algorithm agreed on with the defending device and obtaining a hash value; putting, by the client, the hash value into the first preset field of the service message according to the rule agreed on with the defending device; and transmitting, by the client, the service message processed under the agreed-on rule to the server.

In connection with the second aspect, in a first possible implementation, the second preset field is a field composed of a preset quantity of bytes in a payload area of the service message.

In connection with the first possible implementation of the second aspect, in a second possible implementation, the method further includes: putting, by the client, additional information in a third preset field of the service message according to the rule agreed-on with the defending device, where the additional information is a difference between time when the client transmits the service message and a standard time; and selecting, by the client, the preset quantity of bytes in the payload area of the service message by: calculating, by the client, a remainder of the difference divided by a length of the payload area; determining, by the client, whether a sum of the remainder and the preset number is more than the length of the payload area; and when the sum of the remainder and the preset number is more than the length of the payload area, selecting, by the client, the preset quantity of bytes starting from a start position of the payload area; or when the sum of the remainder and the preset number is equal to or less than the length of the payload area, making, by the client, an offset from the start position of the payload area by a plurality of bytes, the quantity of which is the remainder, and selecting the preset quantity of bytes starting from the offset position.

In connection with the second aspect, or the first possible implementation or the second possible implementation of the second aspect, in a third possible implementation, processing, by the client, the information carried in the second preset field of the service message and the preset key according to the hash algorithm agreed on with the defending device, and obtaining the hash value includes: determining, by the client, a result of a logical XOR operation on the information carried in the second preset field and the preset key as the hash value. A length of the second preset field is two bytes, and a length of the preset key is two bytes.

In a third aspect, a device for defending against distributed denial of service attacks is provided. The device includes: a processor and a memory storing at least one instruction. The processor is configured to execute the at least one instruction to: intercept a service message transmitted by a client to a server; obtain information carried in a first preset field of the service message and information carried in a second preset field of the service message according to a rule agreed on with the client; process the information carried in the second preset field and a preset key according to a hash algorithm agreed on with the client, and obtain a hash value; and discard the service message upon determining that the hash value is different from the information carried in the first preset field.

In connection with the third aspect, in a first possible implementation, the information carried in the first preset field is a hash value obtained by the client by processing the information carried in the second preset field and the preset key according to the hash algorithm, and the second preset field is a field composed of a preset quantity of bytes in a payload area of the service message.

In connection with the first possible implementation of the third aspect, in a second possible implementation, the processor is further configured to execute the at least one instruction to: obtain additional information carried in a third preset field of the service message according to the rule agreed on with the client, where the additional information is a difference between time when the client transmits the service message and a standard time; and select the preset quantity of bytes in the payload area of the service message by: calculating a remainder of the difference divided by a length of the payload area; determining whether a sum of the remainder and the preset number is more than the length of the payload area; and when the sum of the remainder and preset number is more than the length of the payload area, selecting the preset quantity of bytes starting from a start position of the payload area; or when the sum of the remainder and the preset number is equal to or less than the length of the payload area, making an offset from the start position of the payload area by a plurality of bytes, the quantity of which is the remainder, and selecting the preset quantity of bytes starting from the offset position.

In connection with the second possible implementation of the third aspect, in a third possible implementation, the device further includes a transmitter. The processor is further configured to execute the at least one instruction t: subtract a difference in a preceding service message transmitted by the client from the difference in the service message to obtain a temporal difference upon determining that the hash value is the same as the information carried in the first preset field; determine whether the temporal difference lies in a preset range; and when the temporal difference lies in the preset range, control the transmitter to forward the service message to the server; or when the temporal difference does not lie in the preset range, discard the service message.

In connection with the third possible implementation of the third aspect, in a fourth possible implementation, the processor is further configured to execute the at least one instruction to: determine a result of a logical XOR operation on the information carried in the second preset field and the preset key as the hash value. A length of the second preset field is two bytes, and a length of the preset key is two bytes.

In a fourth aspect, a device for defending against distributed denial of service attacks is provided. The device includes a transmitter, a processor, and a memory storing at least one instruction. The processor is configured to execute the at least one instruction to: process information carried in a second preset field of a service message and a preset key according to a hash algorithm agreed on with a defending apparatus, and obtain a hash value; put the hash value into a first preset field of the service message according to a rule agreed on with the defending apparatus; and control the transmitter to transmit the service message processed under the agreed-on rule to a server.

In connection with the fourth aspect, in a first possible implementation, the second preset field is a field composed of a preset quantity of bytes in a payload area of the service message.

In connection with the first possible implementation of the fourth aspect, in a second possible implementation, the processor is further configured to execute the at least one instruction to: put additional information in a third preset field of the service message according to the rule agreed-on with the defending device, where the additional information is a difference between time when the device transmits the service message and a standard time; and select the preset quantity of bytes in the payload area of the service message by: calculating a remainder of the difference divided by a length of the payload area; determining whether a sum of the remainder and the preset number is more than the length of the payload area; and when the sum of the remainder and the preset number is more than the length of the payload area, selecting the preset quantity of bytes starting from a start position of the payload area; or when the sum of the remainder and the preset number is equal to or less than the length of the payload area, making an offset from the start position of the payload area by a plurality of bytes, the quantity of which is the remainder, and selecting the preset quantity of bytes starting from the offset position.

In connection with the first possible implementation or the second possible implementation of the fourth aspect, in a third possible implementation, the processor is further configured to execute the at least one instruction to: determine a result of a logical XOR operation on the information carried in the second preset field and the preset key as the hash value. A length of the second preset field is two bytes, and a length of the preset key is two bytes.

BRIEF DESCRIPTION OF THE DRAWINGS

In order to make the technical solutions in the embodiments of the disclosure more apparent, the drawings to be used in a description of the embodiments are briefly introduced below, and apparently the drawings to be described below are merely illustrative of some embodiments of the disclosure, and those ordinarily skilled in the art can derive from these drawings other drawings without any inventive effort.

DETAILED DESCRIPTION OF THE EMBODIMENTS

In order to make the objects, the technical solutions and the advantages of the disclosure clearer, the disclosure is further described in details with reference to the drawings. Apparently the described embodiments are only a part but not all of the embodiments of the disclosure. Based upon the embodiments of the disclosure herein, all other embodiments derived by those ordinarily skilled in the art without any inventive effort shall come into the scope of the disclosure.

First Embodiment

Figure 1:
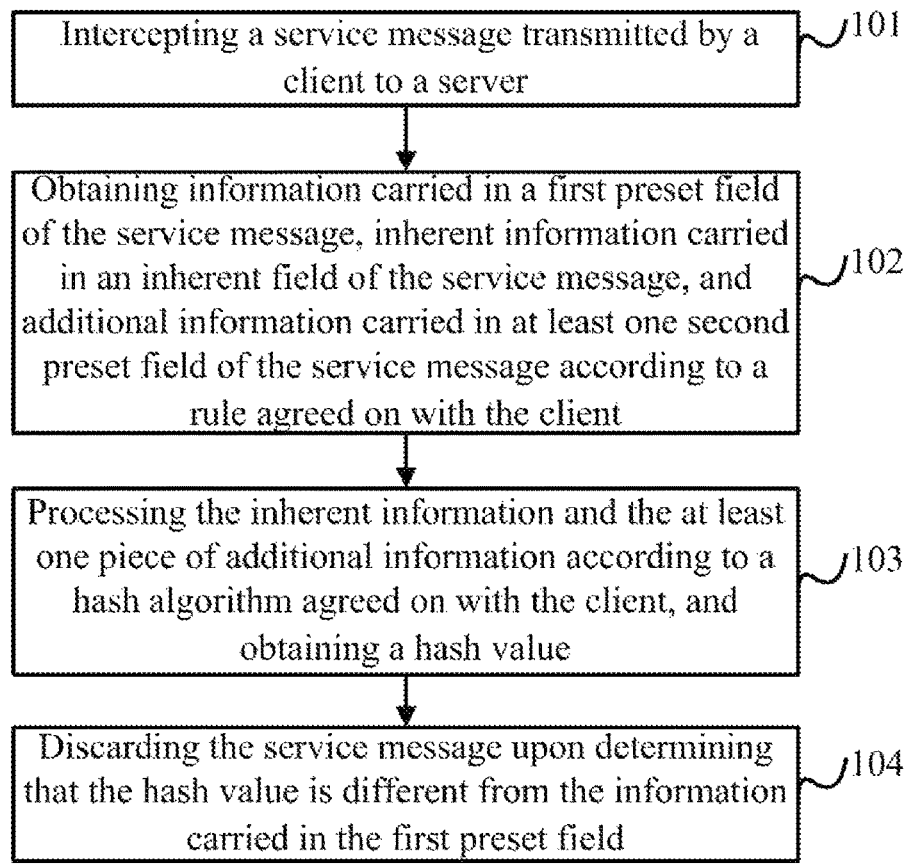
FIG. 1 is a first schematic diagram of a method for defending against distributed denial of service attacks according to an embodiment of the disclosure.

An embodiment of the disclosure provides a method for defending against distributed denial of service attacks. As illustrated in FIG. 1, the method includes the following operations.

The operation 101 is intercepting a service message transmitted by a client to a server.

In an implementation, an apparatus defending against DDOS attacks (a defending apparatus) intercepts the service message transmitted by the client to the server. The service message transmitted by the client is a message in a Transmission Control Protocol (TCP) or User Datagram Protocol (UDP) format, such as a TCP request message, a UDP request message, or another message for communication with the server.

The operation 102 is obtaining information carried in a first preset field of the service message, inherent information carried in an inherent field of the service message, and additional information carried in at least one second preset field of the service message according to a rule agreed on with the client.

Figure 2:
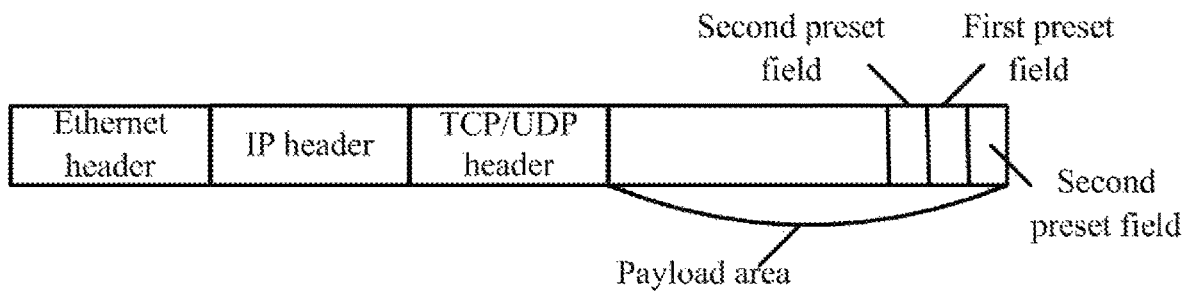
FIG. 2 is a first schematic diagram of a format of a service message according to an embodiment of the disclosure.

The rule agreed on with the client is that for each service message from the client, obtaining information carried in specified fields of the service message. In the embodiment of the disclosure, the information carried in the first preset field of the service message, the inherent information carried in the inherent field of the service message, and the additional information carried in the at least one second preset field of the service message is obtained. The inherent field is a field specified by a public protocol, and the inherent information is information specified by the public protocol to be carried in the service message. The first preset field and the at least one second preset field may be newly added fields, or may be editable fields in the service message. In an implementation, the first preset field and the at least one second preset field are fields in a payload area of the service message. In an implementation, the first preset field and the at least one second preset field are arranged in a preset order starting from the end of the load area of the service message. The embodiments of the disclosure do not restrict the arrangement order of the first preset field and each second preset field in the payload area, as long as the defending apparatus and the client can agree on the order of the first preset field and each second preset field in the payload area in advance. For example, the service message has two second preset fields, the first preset field and the two second preset fields are arranged in such an order that one of the second preset fields, the first preset field, and the other second preset field are adjacent, where one of the second preset fields is located at the end of the payload area, the first preset field is located before this second preset field, and the other second preset field is located before the first preset field. FIG. 2 illustrates a format of a service message according to an embodiment of the disclosure, where fields corresponding to an Ethernet header, an IP header, and a TCP/UDP header are fixed fields of the service message, that is, the contents of the fixed fields do not change, whereas contents carried in the payload area varies when the function of the service message varies. FIG. 2 illustrates the positions of the first preset field and two second preset fields. The positions of the first preset field and the two second preset fields illustrated by FIG. 2 are only an example, and the first preset field and the two second preset fields may be located at other positions in the payload area.

The operation 103 is processing the inherent information and the at least one piece of additional information according to a hash algorithm agreed on with the client, and obtaining a hash value.

In an implementation, the defending apparatus and the client agree on the hash algorithm, the defending apparatus obtains the inherent information and each piece of additional information in the service message transmitted by the client, and then processes the inherent information and each piece of additional information according to the hash algorithm to obtain the hash value.

The operation 104 is discarding the service message upon determining that the hash value is different from the information carried in the first preset field.

In an implementation, information carried in a first preset field in a non-attack service message is a hash value obtained by a client transmitting the non-attack service message. The client obtains the hash value by processing inherent information and additional information in the non-attack service message according to the hash algorithm agreed on with the defending apparatus. Whereas information carried in a first preset field in an attack message is unknown information. Therefore, the defending apparatus compares the hash value calculated by itself with the information carried in the first preset field in the service message, and when the hash value calculated by itself is different from the information carried in the first preset field of the received service message, the defending apparatus determines that the service message is an attack message, and discards the service message.

In the embodiment of the disclosure, the defending apparatus obtains the information carried in the first preset field, the inherent information carried in the inherent field and the additional information carried in the at least one second preset field of the service message according to the rule agreed on with the client, processes the inherent information and the additional information according to the hash algorithm agreed on with the client, compares the hash value with the information carried in the first preset field, and determines whether to discard the service message according to the comparison result, as such, the purpose of defending against DDOS attacks is achieved; and comparing with the existing method for defending against DDOS attacks by analyzing characteristics of various service messages automatically through statistics and machine learning, in the embodiment of the disclosure, since the defending apparatus and the client agree on the rule and the hash algorithm in advance, it is not needed to analyze characteristics of various service messages, thus lowering implementation complexity and a probability of discarding a non-attack message (a normal message).

In an implementation, at the defending apparatus' side, the defending apparatus determines by default according to the rule agreed on with the client that the information carried in the first preset field of the service message is the hash value obtained by the client by processing the inherent information carried in the inherent field and the additional information carried in the at least one second preset field according to the hash algorithm. The defending apparatus determines by default according to the rule agreed on with the client that the inherent information carried in the inherent field is a public network IP address of the client, where the public network IP address is located in the IP header in the format of the service message illustrated in FIG. 2. The service message has two second preset fields, and the defending apparatus determines by default according to the rule agreed on with the client that the additional information carried in the two second preset fields are a local IP address of the client, and response time for a latest response message returned by the server to the client, respectively. That is, before proceeding to the operation 104, no matter whether the service message intercepted by the defending apparatus is a non-attack message or not, the defending apparatus determines by default that the information carried in the first preset field of the service message is the hash value obtained by the client by processing the inherent information carried in the inherent field and the additional information carried in the at least one second preset field according to the hash algorithm, the inherent information carried in the inherent field is the public network IP address of the client, and the additional information carried in the two second preset fields are the local IP address of the client, and the response time for the latest response message returned by the server to the client, respectively. Of course, the defending apparatus and the client can also agree on that the inherent information carried in the inherent field is other information different from the public network IP address of the client, and the additional information can also be some other information, although the embodiments of the disclosure are not limited thereto.

When it is the first time for the client to transmit a service message to the server, the value of the response time for the latest response message returned by the server to the client, carried in the service message is 0 or another default value.

In an implementation, when the additional information includes the local IP address of the client and the public network IP address of the client, an attacking client can be determined from the local IP address upon determining that the service message being processed by the defending apparatus is an attack message. Whereas conventionally the service message does not carry any local IP address of the client, but only carries the public network IP address of the client, since multiple clients correspond to a same public network IP address in a same Network Address Translation (NAT) context, it is difficult to locate a particular attacking client. In the embodiment of the disclosure, the particular attacking client can be located using the local IP address of the client, thereby further restricting behaviors of the attacking client.

When the defending apparatus determines that the service message being processed by itself is an attack message, it can add the public network IP address and the local IP address of the client, carried in the attack message to a blacklist. For each client in the blacklist, time for the client to remain in the blacklist can be set, and when such time becomes zero, the public network IP address and the local IP address of the client can be removed from the blacklist. In an implementation, after the blacklist is created, for each service message, the defending apparatus firstly searches the blacklist for a client transmitting the service message, and if the client is found in the blacklist, then the service message is discarded directly, and time for the client to remain in the blacklist can be set to a maximum value. If the client is not found in the blacklist, the process of defending against DDOS attacks as illustrated in FIG. 1 is performed on the service message.

Figure 3:
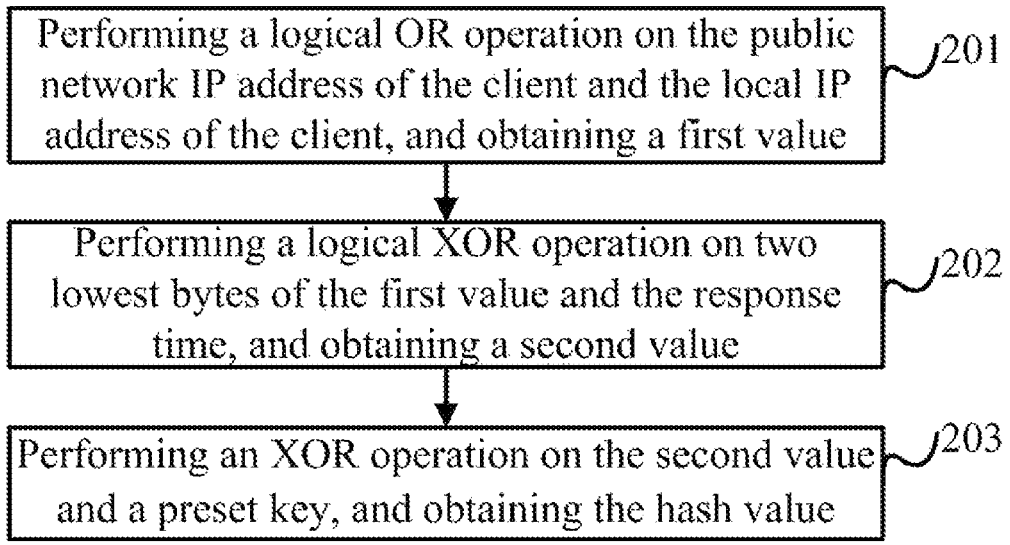
FIG. 3 is a first flow chart of a processing method according to an embodiment of the disclosure.

In an implementation, when the defending apparatus and the client agree on that the inherent information carried in the inherent field is the public network IP address of the client, the service message has two second preset fields, and the additional information carried in the two second preset fields are a local IP address of the client, and response time for a latest response message returned by the server to the client, respectively, the defending apparatus processes the inherent information carried in the inherent field and the at least one piece of additional information according to the hashing algorithm agreed on with the client, in the operation 103 as illustrated by FIG. 3 as follows.

The operation 201 is performing a logical OR operation on the public network IP address of the client and the local IP address of the client, and obtaining a first value.

In an implementation, the lengths of the public network IP address and the local IP address of the client are four bytes, respectively, and the length of the first preset field of the service message is four bytes, and the length of the second preset field carrying the local IP address is also four bytes. Since the information in the service message is presented in a string of binary characters, the logical OR operation is performed on the public network IP address of the client and the local IP address of the client. In an implementation, the logical OR operation is performed on a string of binary characters corresponding to the public network IP address of the client, and a string of binary characters corresponding to the local IP address of the client, and the obtained first value is also presented in a string of binary characters.

The operation 202 is performing a logical XOR operation on two lowest bytes of the first value and the response time, and obtaining a second value.

In an implementation, the length of the first value is four bytes, and the logical XOR operation is performed on the two lowest bytes of the first value and the response time. The response time is response time for the latest response message returned by the server to the client, and the length of the response time is two bytes. In an implementation, the logical XOR operation is performed on a string of binary characters corresponding to the two lowest bytes of the first value and a string of binary characters corresponding to the response time, to obtain the second value, which is presented in a string of binary characters.

The operation 203 is performing an XOR operation on the second value and a preset key, and obtaining the hash value.

In an implementation, the length of the second value is two bytes, and the length of the preset key is also two bytes, and the XOR operation on a string of binary characters corresponding to the second value and a string of binary characters corresponding to the preset key produces the hash value, where the preset key is a key agreed on by the defending apparatus and the client.

The embodiment of the disclosure provides a particular hash algorithm that is agreed on by the defending apparatus and the client, and the defending apparatus processes the obtained inherent information and additional information to obtain the hash value at the defending apparatus' side.

The hash algorithm according to the embodiment of the disclosure is only an exemplary implementation. The hash algorithm agreed on by the defending apparatus and the client may also be another hash algorithm, and the embodiment of the disclosure is not limited thereto, as long as both the defending apparatus side and the client side comply with the same hash algorithm.

Figure 4:
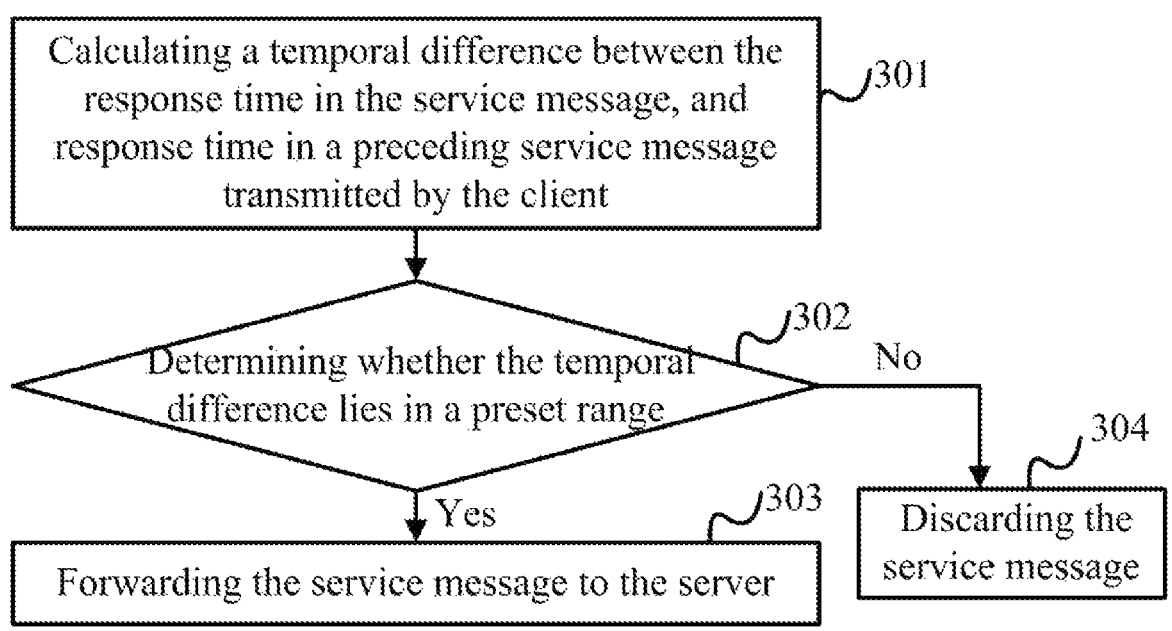
FIG. 4 is a second schematic diagram of a method for defending against distributed denial of service attacks according to an embodiment of the disclosure.

In an implementation, when the additional information carried in one of the second preset fields of the service message is the response time for the latest response message returned by the server to the client, then if it is determined that the hash value calculated by the defending apparatus is the same as the information carried in the first preset field, the method includes the following operations as illustrated in FIG. 4.

The operation 301 is calculating a temporal difference between the response time in the service message, and response time in a preceding service message transmitted by the client.

In an implementation, the response time in the service message is the response time, for the latest response message returned by the server to the client, carried in one of the second preset fields of the service message. The preceding service message is a non-attack service message adjacent to the current service message and processed by the defending apparatus before the current service message. In an implementation, the response time in the service message is the difference between the time when the server transmits the response message and a standard time, and the unit of the response time is second, so the unit of the temporal difference calculated in the operation 301 is second.

The operation 302 is determining whether the temporal difference lies in a preset range, and if the temporal difference lies in the preset range, proceeding to the operation 303; or when the temporal difference does not lie in the preset range, proceeding to the operation 304.

In an implementation, the preset range can be set according to the real scenario, and the preset range is not limited to any particular range in the embodiment of the disclosure. In an implementation, when the temporal difference T is more than −60 and less than 60, it is determined that the temporal difference T lies in the preset range; otherwise, it is determined that the temporal difference T does not lie in the preset range, that is, the preset range is (−60, 60).

The operation 303 is forwarding the service message to the server.

The operation 304 is discarding the service message.

In an implementation, when the temporal difference in the operation 301 lies in the preset range, it is determined that the current service message is not a playback attack message, and when the temporal difference in the operation 301 does not lie in the preset range, it is determined that the current service message is a playback attack message. The embodiment of the disclosure can defend against both DDOS attacks and playback attacks.

The operation 302 is only one implementation for determining whether to discard the service message, and other implementations might be used to determine whether to discard the service message. For example, suppose a length of response time in each service message is two bytes, the response time in the current service message is A1, and the response time in the preceding service message transmitted by the client is A2. When A1 is more than A2, and A1−A2<B, the flow proceeds to the operation 303; otherwise, the flow proceeds to the operation 304. When A1 is less than A2, and C+A1−A2<B, the flow proceeds to the operation 303; otherwise, the flow proceeds to the operation 304. B is a preset temporal threshold, and C is a decimal number corresponding to 0xffff.

Second Embodiment

FIG. 1 illustrates the method at the defending apparatus' side for defending against distributed denial of service attacks according to the embodiment of the disclosure, and a method at the client's side for defending against distributed denial of service attacks according to an embodiment of the disclosure are described in details below.

Figure 5:
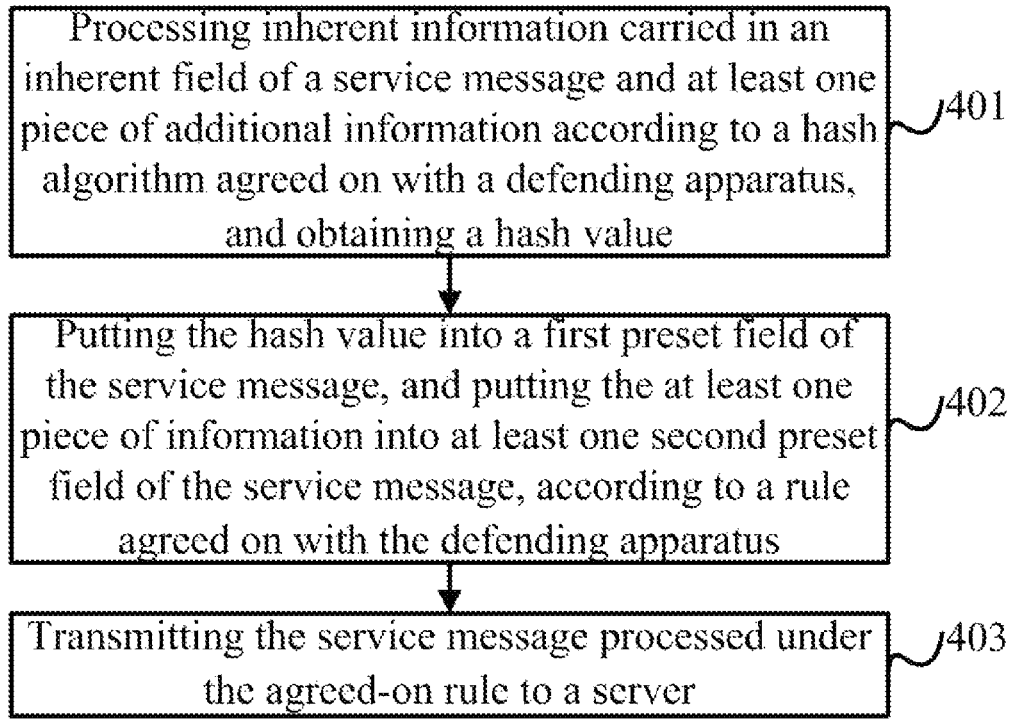
FIG. 5 is a third schematic diagram of a method for defending against distributed denial of service attacks according to an embodiment of the disclosure.

Corresponding to the embodiment illustrated in FIG. 1, an embodiment of the disclosure further provides a method for defending against distributed denial of service attacks, and as illustrated in FIG. 5, the method includes the following operations.

The operation 401 is processing inherent information carried in an inherent field of a service message and at least one piece of additional information according to a hash algorithm agreed on with a defending apparatus, and obtaining a hash value.

The operation 402 is putting the hash value into a first preset field of the service message, and putting the at least one piece of information into at least one second preset field of the service message, according to a rule agreed on with the defending apparatus.

In an implementation, a piece of additional information corresponds to one of the second preset fields.

Reference can be made to the embodiment illustrated in FIG. 1 for details of the agreed-on hash algorithm, the agreed-on rule, the inherent information, the additional information, the inherent field, and the second preset field in the operation 401 and the operation 402, so a repeated description thereof is omitted herein.

The operation 403 is transmitting the service message processed under the agreed-on rule to a server.

In an implementation, the client transmits the service message, into which the hash value and the additional information is put, to the server, and a destination address of the service message transmitted by the client is directed to the server, but the defending apparatus may intercept the service message transmitted by the client.

In the embodiment of the disclosure, the client processes the inherent information carried in the inherent field of the service message and the at least one piece of additional information according to the hash algorithm agreed on with the defending apparatus, puts the hash value into the first preset field of the service message, and the at least one piece of information into the at least one second preset field of the service message, respectively, according to the rule agreed on with the defending apparatus, and transmits the service message to the server, so that the service messages transmitted by the non-attack client have significant characteristics, facilitating the defending apparatus to filter the service messages according to the rule and the hash algorithm agreed on with the client without analyzing characteristics of various service messages, lowering implementation complexity and a probability of discarding a non-attack message (a normal message).

In an implementation, in the embodiment illustrated in FIG. 5, the inherent information carried in the inherent field is a public network IP address of the client, and the additional information includes a local IP address of the client, and response time for a latest response message returned by the server to the client. When it is the first time for the client to transmit a service message to the server, the value of the response time for the latest response message returned by the server to the client, carried in the service message is 0 or another default value.

Figure 6:
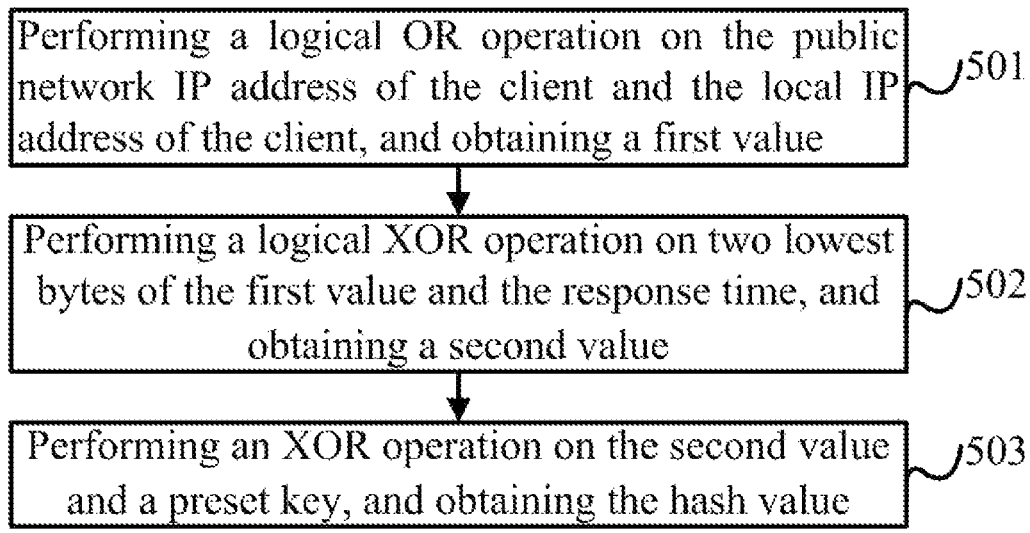
FIG. 6 is a second flow chart of a processing method according to an embodiment of the disclosure.

In an implementation, the inherent information carried in the inherent field of the service message and the at least one piece of additional information is processed according to the hash algorithm agreed on with the defending apparatus to obtain the hash value, in the operation 401 as illustrated in FIG. 6 in an implementation as follows.

The operation 501 is performing a logical OR operation on the public network IP address of the client and the local IP address of the client, and obtaining a first value.

The operation 502 is performing a logical XOR operation on two lowest bytes of the first value and the response time, and obtaining a second value.

The operation 503 is performing an XOR operation on the second value and a preset key, and obtaining the hash value.

The lengths of the preset key and the response time are two bytes respectively, and the lengths of the public network IP address and the local IP address are four bytes respectively.

The two implementations corresponding to FIG. 5 are similar to those of their counterpart implementations corresponding to FIG. 1, so a repeated description thereof is omitted herein.

Third Embodiment

Figure 7:
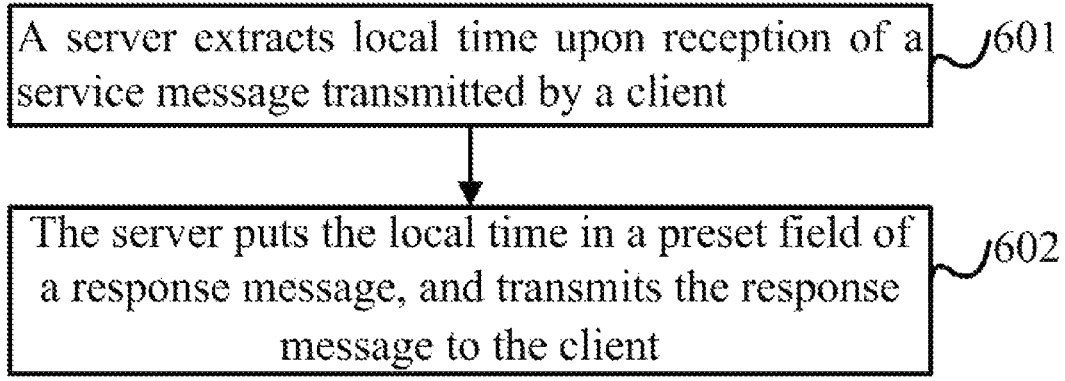
FIG. 7 is a fourth schematic diagram of a method for defending against distributed denial of service attacks according to an embodiment of the disclosure.

FIG. 5 illustrates the embodiment in which the service message carries the response time for the latest response message returned by the server to the client, but conventionally, the response message the server returns to the client does not carry the response time, so an embodiment of the disclosure further provides a method for defending against distributed denial of service attacks, and as illustrated in FIG. 7, the method includes the following operations.

In the operation 601, a server extracts local time upon reception of a service message transmitted by a client.

The local time is the difference between seconds corresponding to a moment when the server returns a response message, and a standard time. The local time in the operation 601 is the response time for the response message returned by the server to the client as referred to in the previous embodiments.

In the operation 602, the server puts the local time in a preset field of a response message, and transmits the response message to the client.

In an implementation, the server puts the local time into the preset field of the response message, and then transmits the response message to the client. The client extracts the local time from the preset field of the response message upon reception of the response message returned by the server, and determines the local time as response time for the response message returned by the server to the client.

The method for defending against distributed denial of service attacks at the server's side according to the embodiment of the disclosure enables a defending apparatus to defend against DDOS attacks using the method according to the embodiment of the disclosure.

Fourth Embodiment

Figure 8:
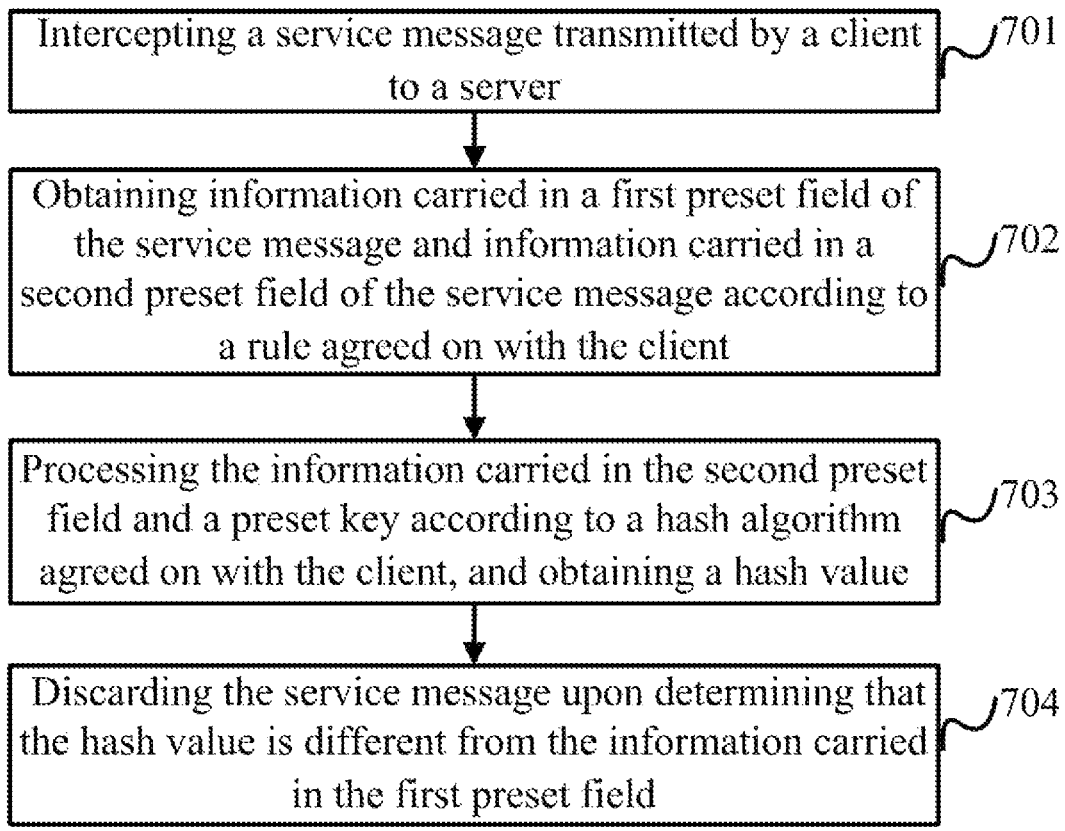
FIG. 8 is a fifth schematic diagram of a method for defending against distributed denial of service attacks according to an embodiment of the disclosure.

An embodiment of the disclosure further provides a method for defending against distributed denial of service attacks, and as illustrated in FIG. 8, the method includes the following operations.

The operation 701 is intercepting a service message transmitted by a client to a server.

In an implementation, an apparatus defending against DDOS attacks (a defending apparatus) intercepts the service message transmitted by the client to the server. The service message transmitted by the client is a message in the TCP or UDP format, such as a TCP request message, a UDP request message, or another message for communication with the server.

The operation 702 is obtaining information carried in a first preset field of the service message and information carried in a second preset field of the service message according to a rule agreed on with the client.

The rule agreed on with the client is that for each service message from the client, information carried in specified fields of the service message is obtained, and in the embodiment of the disclosure, the information carried in the first preset field of the service message, and the information carried in the second preset field of the service message is obtained. In an implementation, the first preset field and the second preset field are fields in a payload area of the service message. In an implementation, the first preset field is located at the end of the load area of the service message.

The operation 703 is processing the information carried in the second preset field and a preset key according to a hash algorithm agreed on with the client, and obtaining a hash value.

In an implementation, the defending apparatus processes the information carried in the second preset field and the preset key agreed on with the client, according to the hash algorithm agreed on with the client, and obtains the hash value at the defending apparatus' side.

The operation 704 is discarding the service message upon determining that the hash value is different from the information carried in the first preset field.

In an implementation, information carried in a first preset field in a non-attack service message is a hash value obtained by a client transmitting the non-attack service message. The client obtains the hash value by processing information carried in a second preset field in the non-attack service message and a preset key according to the hash algorithm agreed on with the defending apparatus. Information carried in a first preset field in an attack message is unknown information. So the defending apparatus compares the hash value calculated at the defending apparatus' side with the information carried in the first preset field in the service message, and if the hash value at the defending apparatus' side is different from the information carried in the first preset field of the service message received by the defending apparatus, then the defending apparatus determines that the service message is an attack message, and discards the service message.

In the embodiment of the disclosure, the defending apparatus obtains the information carried in the second preset field of the service message according to the rule agreed on with the client, processes the information carried in the second preset field and the preset key according to the hash algorithm agreed on with the client, compares the hash value with the information carried in the first preset field, and determines from a comparison result whether to discard the service message, as such, the purpose of defending against DDOS attacks is achieved; and comparing with the existing method for defending against DDOS attacks by analyzing characteristics of various service messages automatically through statistics and machine learning, in the embodiment of the disclosure, since the defending apparatus and the client agree on the rule and the hash algorithm in advance, it is not needed to analyze characteristics of various service messages, thus lowering implementation complexity and a probability of discarding a non-attack message (a normal message).

In an implementation, at the defending apparatus' side, the defending apparatus determines by default according to the rule agreed on with the client that the information carried in the first preset field of the service message is the hash value obtained by the client by processing the information carried in the second preset field of the service message and the preset key according to the hash algorithm. The second preset field of the service message is a field composed of a preset quantity of bytes in the payload area of the service message, and the information carried in the second preset field of the service message is information corresponding to the preset quantity of bytes in the payload area. In an implementation, the information corresponding to the preset quantity of bytes is presented in a string of binary characters.

In an implementation, in the operation 703, the information carried in the second preset field and the preset key is processed according to the hash algorithm agreed on with the client to obtain the hash value as follows.

A result of a logical XOR operation on the information carried in the second preset field and the preset key is determined as the hash value. The length of the second preset field is two bytes, and the length of the preset key is two bytes.

In an implementation, the logical XOR operation is performed on a string of binary characters corresponding to the information carried in the second preset field and a string of binary characters corresponding to the preset key. The length of the information carried in the second preset field is two bytes, and at this time, the length of the second preset field is two bytes. The length of the preset key is two bytes. However, the lengths of the information carried in the second preset field and the length of the preset key are not limited to two bytes.

The embodiment of the disclosure provides a particular hash algorithm that is agreed on by the defending apparatus and the client, and the defending apparatus processes the obtained information carried in the second preset field and preset key to obtain the hash value at the defending apparatus' side.

The hash algorithm according to the embodiment of the disclosure is only an exemplary implementation, and the hash algorithm agreed on by the defending apparatus and the client can be another hash algorithm, so the embodiment of the disclosure is not limited thereto, as long as both the defending apparatus side and the client side comply with the same hash algorithm.

In an implementation, when the second preset field of the service message is a field composed of the preset quantity of bytes in the payload area of the service message, the method for defending against distributed denial of service attacks according to the embodiment of the disclosure further includes the following operation: obtaining additional information carried in a third preset field of the service message according to the rule agreed on with the client. The additional information is a difference between time when the client transmits the service message and a standard time.

Figure 9:
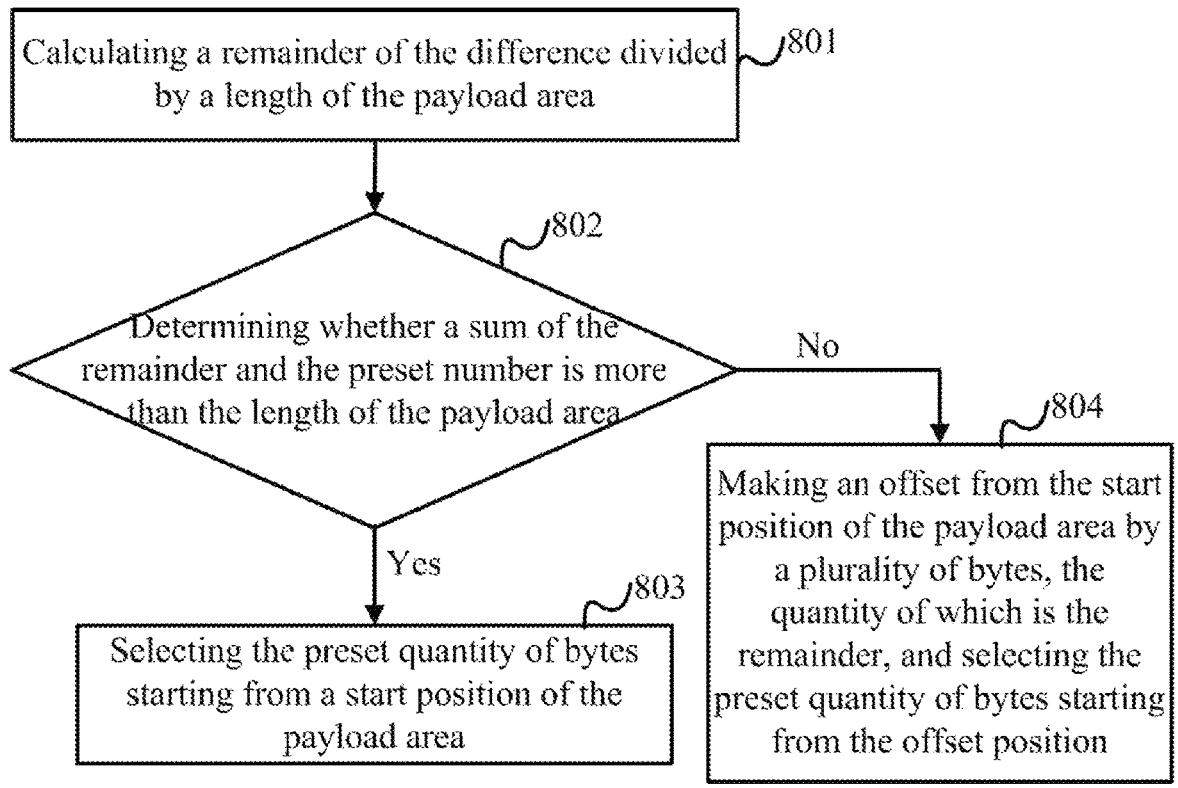
FIG. 9 is a first flow chart of a method for selecting a preset quantity of bytes in a payload area in a service message according to an embodiment of the disclosure.

As illustrated in FIG. 9, the preset quantity of bytes in the payload area of the service message are selected by the following operations.

The operation 801 is calculating a remainder of the difference divided by a length of the payload area.

In an implementation, the preset quantity of bytes are selected from the payload area according to the remainder of the difference divided by the length of the payload area. In an implementation, the third preset field is a field in the payload area. A sequential order of the third preset field and the first preset field in the payload area is not limited to any particular order. In an implementation, the first preset field is located before the third preset field, and the third preset field is located at the end of the payload area. The additional information can also be some other information, e.g., a local IP address of the client, although the embodiment of the disclosure is not limited thereto.

The operation 802 is determining whether a sum of the remainder and the preset number is more than the length of the payload area, and when the sum of the remainder and the preset number is more than the length of the payload area, proceeding to the operation 803; or when the sum of the remainder and the preset number is equal to or less than the length of the payload area, proceeding to the operation 804.

The operation 803 is selecting the preset quantity of bytes starting from a start position of the payload area.

The operation 804 is making an offset from the start position of the payload area by a plurality of bytes, the quantity of which is the remainder, and selecting the preset quantity of bytes starting from the offset position.

In an implementation, the remainder in the operation 801 is the offset position in the payload area, that is, an offset is made from the start position of the payload area toward the end of the payload area by a plurality of bytes, the quantity of which is the remainder, and the preset quantity of bytes are selected starting from the offset position, but when the sum of the remainder and the preset number is more than the length of the payload area, if an offset is made from the start position of the payload area toward the end of the payload area by a plurality of bytes, the quantity of which is the remainder, and the preset quantity of bytes are selected starting from the offset position, then the length of the payload area may be insufficient. For example, if the remainder is 10, the length of the payload area is 11, and the preset number is 2, so the sum of the remainder 10 and the preset number 2 is more than the length of the payload area, then two bytes are selected starting from the start position of the payload area; and if the remainder is 10, the length of the payload area is 15, and the preset number is 2, so the sum of the remainder 10 and the preset number 2 is less than the length of the payload area, then an offset is made from the start position of the payload area toward the end of the payload area by ten bytes, and two bytes are selected starting from the offset position, that is, two bytes are selected starting from the tenth byte of the payload area.

In the embodiment of the disclosure, the information carried in the second preset field can be determined dynamically to improve the accuracy in defending against DDOS attacks.

Figure 10:
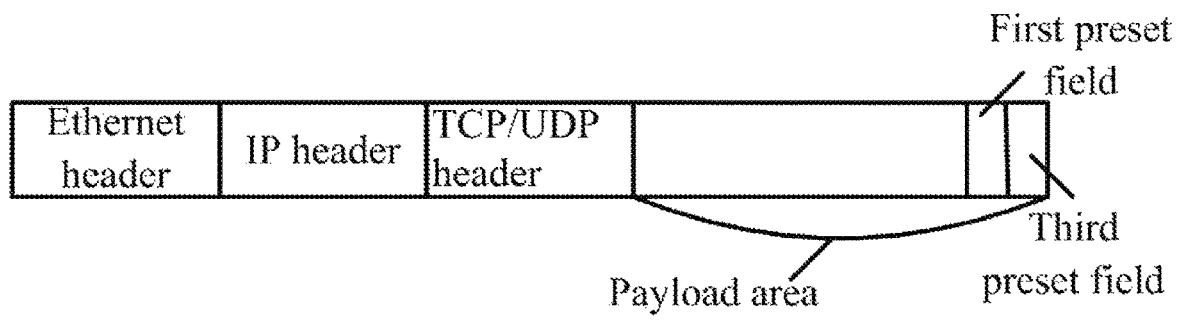
FIG. 10 is a second schematic diagram of a format of a service message according to an embodiment of the disclosure.

FIG. 10 illustrates a format of a service message according to an embodiment of the disclosure, where the positions of the first preset field and the third preset field are denoted, and since the position of the second preset field varies dynamically, it is not denoted in FIG. 10. The positions of the first preset field and the third preset field in FIG. 10 are only an example, and the first preset field and the third preset field can also be located at other positions in the payload area.

Of course, the preset quantity of bytes can also be a preset quantity of bytes at fixed positions in the payload area, although the embodiments of the disclosure are not limited thereto.

Figure 11:
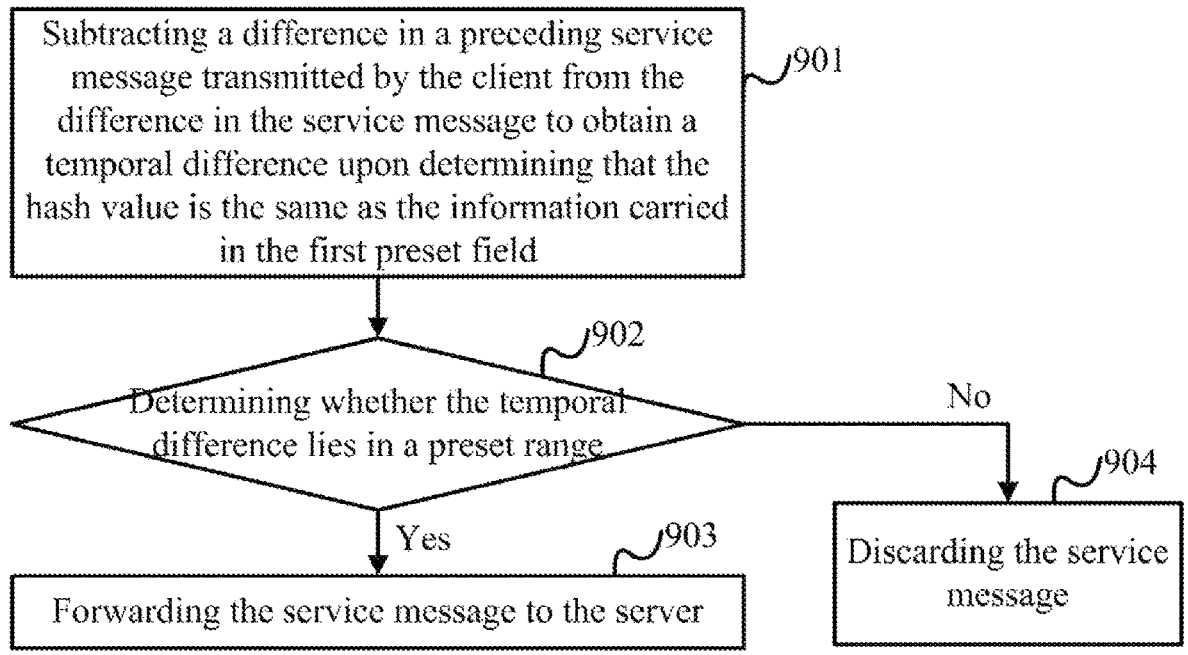
FIG. 11 is a sixth schematic diagram of a method for defending against distributed denial of service attacks according to an embodiment of the disclosure.

When the third preset field of the service message carries the difference between the time when the client transmits the service message and the standard time, the method for defending against distributed denial of service attacks according to the embodiment of the disclosure as illustrated in FIG. 11 further includes the following operations.

The operation 901 is subtracting a difference in a preceding service message transmitted by the client from the difference in the service message to obtain a temporal difference upon determining that the hash value is the same as the information carried in the first preset field.

The preceding service message transmitted by the client is a service message transmitted before and adjacent to the current service message, and reference can be made to the description above of the preceding service message for particular meaning thereof, so a repeated description thereof is omitted here.

The operation 902 is determining whether the temporal difference lies in a preset range, and when the temporal difference lies in the preset range, proceeding to the operation 903; or when the temporal difference does not lie in the preset range, proceeding to the operation 904.

In an implementation, the preset range can be preset according to real scenarios, and the preset range is not limited to any particular range in the embodiment of the disclosure. In an implementation, when the temporal difference T is more than −60 and less than 60, it is determined that the temporal difference T lies in the preset range; otherwise, it is determined that the temporal difference T does not lie in the preset range, that is, the preset range is (−60, 60).

The operation 903 is forwarding the service message to the server.

The operation 904 is discarding the service message.

In an implementation, when the temporal difference in the operation 901 lies in the preset range, it is determined that the current service message is not a playback attack message, and when the temporal difference in the operation 901 does not lie in the preset range, it is determined that the current service message is a playback attack message. The embodiment of the disclosure can defend against both DDOS attacks and playback attacks.

The operation 902 is only one implementation for determining whether to discard the service message, and other implementations might also be used to determine whether to discard the service message. For example, suppose the length of the response time in the service message is two bytes, the response time in the current service message is A1, and the response time in the preceding service message transmitted by the client is A2, when A1 is more than A2, and A1−A2<B, the flow proceeds to the operation 903; otherwise, the flow proceeds to the operation 904. When A1 is less than A2, and C+A1−A2<B, the flow proceeds to the operation 903; otherwise, the flow proceeds to the operation 904. B is a preset temporal threshold, and C is a decimal number corresponding to 0xffff.

Fifth Embodiment

FIG. 8 illustrates the method at the defending apparatus' side for defending against distributed denial of service attacks according to the embodiment of the disclosure, and a method at the client' side for defending against distributed denial of service attacks according to an embodiment of the disclosure is described in details below.

Figure 12:
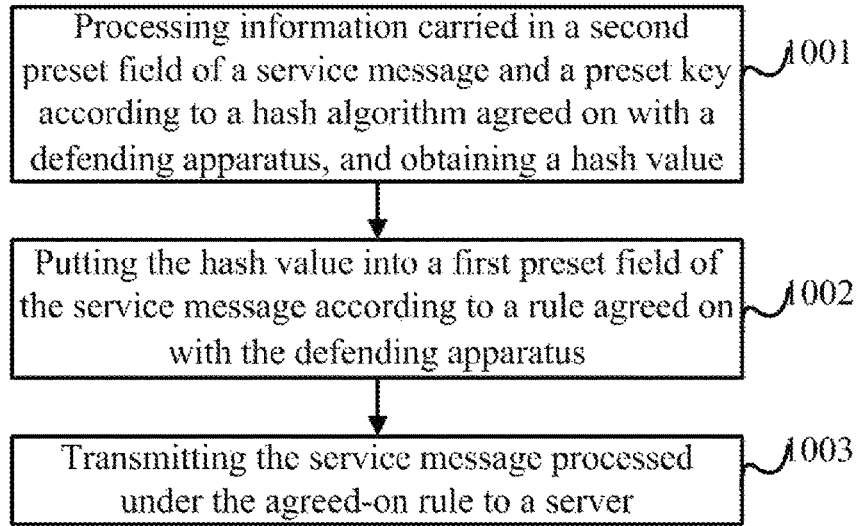
FIG. 12 is a seventh schematic diagram of a method for defending against distributed denial of service attacks according to an embodiment of the disclosure.

In correspondence to the embodiment illustrated in FIG. 8, an embodiment of the disclosure further provides a method for defending against distributed denial of service attacks, and as illustrated in FIG. 12, the method includes the following operations.

The operation 1001 is processing information carried in a second preset field of a service message and a preset key according to a hash algorithm agreed on with a defending apparatus, and obtaining a hash value.

The operation 1002 is putting the hash value into a first preset field of the service message according to a rule agreed on with the defending apparatus.

Reference can be made to the embodiment illustrated in FIG. 8 for details of the agreed-on hash algorithm, the agreed-on rule, the information carried in the second preset field, the information carried in the first preset field, the first preset field, and the second preset field in the operations 1001 and 1002, so a repeated description thereof is omitted here.

The operation 1003 is transmitting the service message processed under the agreed-on rule to a server.

In an implementation, the client transmits the service message, into which the hash value is put, to the server, and a destination address of the service message transmitted by the client is directed to the server, but the defending apparatus may intercept the service message transmitted by the client.

In the embodiment of the disclosure, the client processes the information carried in the second preset field of a service message and the preset key according to the hash algorithm agreed on with the defending apparatus, puts the hash value into the first preset field of the service message according to the rule agreed on with the defending apparatus, and transmits the service message to the server, so that the service messages transmitted by the non-attack client have significant characteristics, facilitating the defending apparatus to filter the service messages according to the rule and the hash algorithm agreed on with the client without analyzing characteristics of various service messages, lowering implementation complexity and a probability of discarding a non-attack message (a normal message).

In an implementation, the second preset field of the service message is a field composed of a preset quantity of bytes in a payload area of the service message.

In an implementation, the method for defending against distributed denial of service attacks according to the embodiment of the disclosure further includes the following operation: putting additional information in a third preset field of the service message according to the rule agreed-on with the defending apparatus. The additional information is a difference between time when the client transmits the service message and a standard time.

Figure 13:
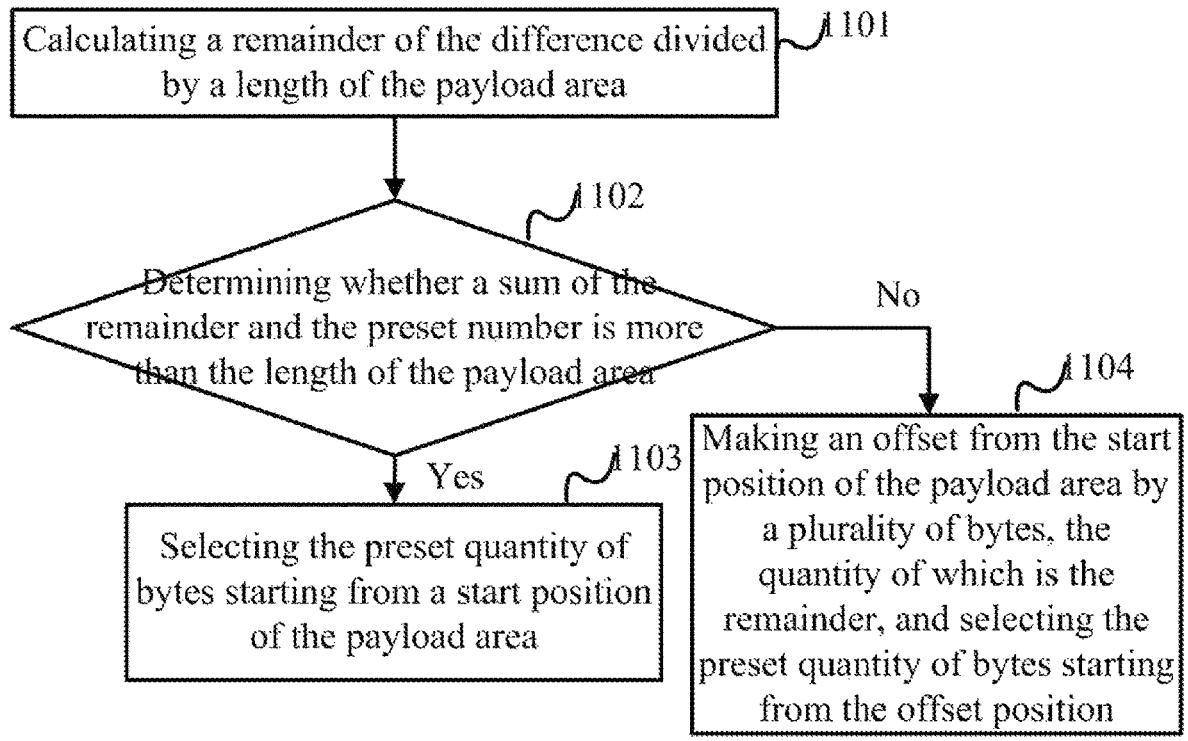
FIG. 13 is a second flow chart of a method for selecting a preset quantity of bytes in a payload area in a service message according to an embodiment of the disclosure.

As illustrated in FIG. 13, the preset quantity of bytes in the payload area of the service message are selected by the following operations.

The operation 1101 is calculating a remainder of the difference divided by a length of the payload area.

The operation 1102 is determining whether a sum of the remainder and the preset number is more than the length of the payload area, and when the sum of the remainder and the preset number is more than the length of the payload area, proceeding to the operation 1103; when the sum of the remainder and the preset number is equal to or less than the length of the payload area, proceeding to the operation 1104.

The operation 1103 is selecting the preset quantity of bytes starting from a start position of the payload area.

The operation 1104 is making an offset from the start position of the payload area by a plurality of bytes, the quantity of which is the remainder, and selecting the preset quantity of bytes starting from the offset position.

In an implementation, in the operation 1001, the information carried in the second preset field of the service message and the preset key is processed according to the hash algorithm agreed on with the client to obtain the hash value by determining a result of a logical XOR operation on the information carried in the second preset field and the preset key as the hash value. A length of the second preset field is two bytes, and a length of the preset key is two bytes.

Particular implementations according to the embodiment of the disclosure are similar to those of their counterpart preferable implementations corresponding to FIG. 8, so a repeated description thereof is omitted here.

Sixth Embodiment

Figure 14:
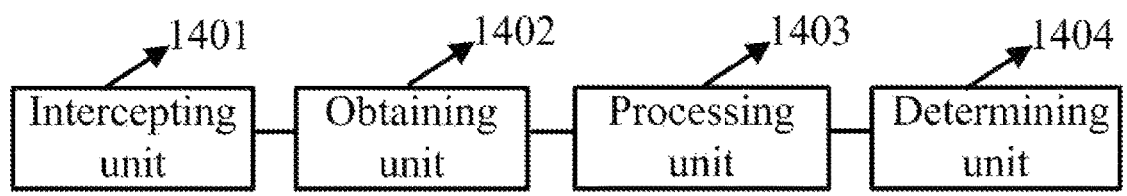
FIG. 14 is a first schematic diagram of a device for defending against distributed denial of service attacks according to an embodiment of the disclosure.

In correspondence to the first embodiment, an embodiment of the disclosure provides a device for defending against distributed denial of service attacks. As illustrated in FIG. 14, the device includes an intercepting unit 1401, an obtaining unit 1402, a processing unit 1403 and a determining unit 1404.

The intercepting unit 1401 is configured to intercept a service message transmitted by a client to a server.

The obtaining unit 1402 is configured to obtain information carried in a first preset field of the service message, inherent information carried in an inherent field of the service message, and additional information carried in at least one second preset field of the service message according to a rule agreed on with the client.

The processing unit 1403 is configured to process the inherent information and the at least one piece of additional information according to a hash algorithm agreed on with the client, and to obtain a hash value.

A determining unit 1404 is configured to discard the service message upon determining that the hash value is different from the information carried in the first preset field.

In an implementation, the information carried in the first preset field is a hash value obtained by the client by processing the inherent information carried in the inherent field and the additional information carried in the at least one second preset field according to the hash algorithm, the inherent information carried in the inherent field is a public network IP address of the client, the service message has two second preset fields, and the additional information carried in the two second preset fields are a local IP address of the client, and response time for a latest response message returned by the server to the client, respectively.

In an implementation, the processing unit is configured to: perform a logical OR operation on the public network IP address of the client and the local IP address of the client, and obtain a first value; perform a logical XOR operation on two lowest bytes of the first value and the response time, and obtain a second value; and perform an XOR operation on the second value and a preset key, and obtain the hash value. The lengths of the preset key and the response time are two bytes respectively, and the lengths of the public network IP address and the local IP address are four bytes respectively.

In an implementation, the determining unit is further configured to: calculate a temporal difference between the response time in the service message, and response time in a preceding service message transmitted by the client upon determining that the hash value is the same as the information carried in the first preset field; determine whether the temporal difference lies in a preset range; and when the temporal difference lies in the preset range, forward the service message to the server; or when the temporal difference does not lie in the preset range, discard the service message.

An embodiment of the disclosure further provides a defending apparatus. The defending apparatus includes any one of the devices according to the sixth embodiment.

Seventh Embodiment

Figure 15:
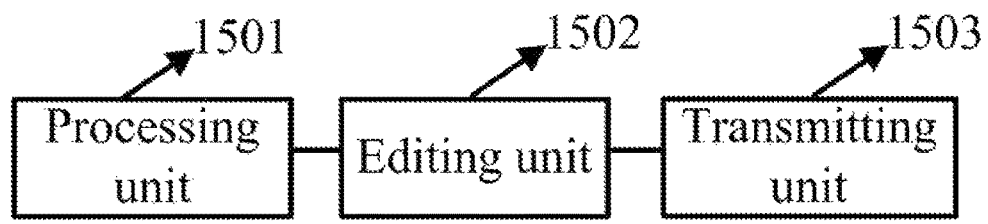
FIG. 15 is a second schematic diagram of a device for defending against distributed denial of service attacks according to an embodiment of the disclosure.

In correspondence to the second embodiment, an embodiment of the disclosure provides a device for defending against distributed denial of service attacks. As illustrated in FIG. 15, the device includes a processing unit 1501, an editing unit 1502 and a transmitting unit 1503.

The processing unit 1501 is configured to process inherent information carried in an inherent field of a service message and at least one piece of additional information according to a hash algorithm agreed on with a defending apparatus, and to obtain a hash value.

The editing unit 1502 is configured to put the hash value into a first preset field of the service message, and to put the at least one piece of information into at least one second preset field of the service message, according to a rule agreed on with the defending apparatus.

The transmitting unit 1503 is configured to transmit the service message processed under the agreed-on rule to a server.

In an implementation, the inherent information carried in the inherent field is a public network IP address of the device, and the additional information includes a local IP address of the device and response time for a latest response message returned by the server to the device.

In an implementation, the processing unit is configured to: perform a logical OR operation on the public network IP address of the device and the local IP address of the device, and obtain a first value; perform a logical XOR operation on two lowest bytes of the first value and the response time, and obtain a second value; and perform an XOR operation on the second value and a preset key, and obtain the hash value. The lengths of the preset key and the response time are two bytes respectively, and the lengths of the public network IP address and the local IP address are four bytes respectively.

An embodiment of the disclosure further provides a client including any one of the devices according to the seventh embodiment.

Eighth Embodiment

Figure 16:
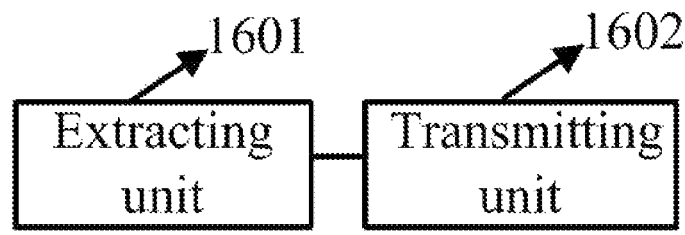
FIG. 16 is a third schematic diagram of a device for defending against distributed denial of service attacks according to an embodiment of the disclosure.

In correspondence to the third embodiment, an embodiment of the disclosure provides a device for defending against distributed denial of service attacks. As illustrated in FIG. 16, the device includes an extracting unit 1601 and a transmitting unit 1602.

The extracting unit 1601 is configured to extract local time upon reception of a service message transmitted by a client.

The transmitting unit 1602 is configured to put the local time in a preset field of a response message, and to transmit the response message to the client.

An embodiment of the disclosure further provides a server apparatus including the device illustrated in FIG. 16.

Ninth Embodiment

Figure 17:
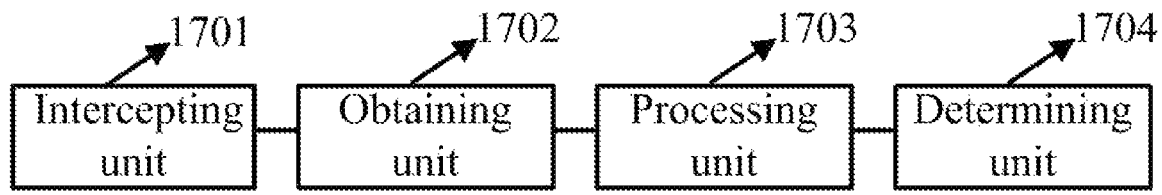
FIG. 17 is a fourth schematic diagram of a device for defending against distributed denial of service attacks according to an embodiment of the disclosure.

In correspondence to the fourth embodiment, an embodiment of the disclosure provides a device for defending against distributed denial of service attacks. As illustrated in FIG. 17, the device includes: an intercepting unit 1701, an obtaining unit 1702, a processing unit 1703 and a determining unit 1704.

The intercepting unit 1701 is configured to intercept a service message transmitted by a client to a server.

The obtaining unit 1702 is configured to obtain information carried in a first preset field of the service message and information carried in a second preset field of the service message according to a rule agreed on with the client.

The processing unit 1703 is configured to process the information carried in the second preset field and a preset key according to a hash algorithm agreed on with the client, and obtain a hash value.

A determining unit 1704 is configured to discard the service message upon determining that the hash value is different from the information carried in the first preset field.

In an implementation, the information carried in the first preset field is a hash value obtained by the client by processing the information carried in the second preset field and the preset key according to the hash algorithm, and the second preset field is a field composed of a preset quantity of bytes in a payload area of the service message.

In an implementation, the obtaining unit is further configured to: obtain additional information carried in a third preset field of the service message according to the rule agreed on with the client, where the additional information is a difference between time when the client transmits the service message and a standard time; and select the preset quantity of bytes in the payload area of the service message by: calculating a remainder of the difference divided by a length of the payload area; determining whether a sum of the remainder and the preset number is more than the length of the payload area; and when the sum of the remainder and the preset number is more than the length of the payload area, selecting the preset quantity of bytes starting from a start position of the payload area; or when the sum of the remainder and the preset number is equal to or less than the length of the payload area, making an offset from the start position of the payload area by a plurality of bytes, the quantity of which is the remainder, and selecting the preset quantity of bytes starting from the offset position.

In an implementation, the determining unit is further configured to: subtract a difference in a preceding service message transmitted by the client from the difference in the service message to obtain a temporal difference upon determining that the hash value is the same as the information carried in the first preset field; determine whether the temporal difference lies in a preset range; and when the temporal difference lies in the preset range, forward the service message to the server; or when the temporal difference does not lie in the preset range, discard the service message.

In an implementation, the processing unit is further configured to: determine a result of a logical XOR operation on the information carried in the second preset field and the preset key as the hash value. A length of the second preset field is two bytes, and a length of the preset key is two bytes.

An embodiment of the disclosure further provides a defending apparatus including any one of the devices according to the ninth embodiment.

Tenth Embodiment

Figure 18:
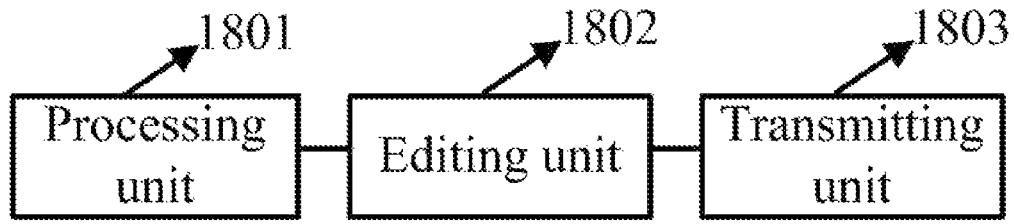
FIG. 18 is a fifth schematic diagram of a device for defending against distributed denial of service attacks according to an embodiment of the disclosure.

In correspondence to the fifth embodiment, an embodiment of the disclosure provides a device for defending against distributed denial of service attacks. As illustrated in FIG. 18, the device includes: a processing unit 1801, an editing unit 1802 and transmitting unit 1803.

The processing unit 1801 is configured to process information carried in a second preset field of a service message and a preset key according to a hash algorithm agreed on with a defending apparatus, and to obtain a hash value.

The editing unit 1802 is configured to put the hash value into a first preset field of the service message according to a rule agreed on with the defending apparatus.

The transmitting unit 1803 is configured to transmit the service message processed under the agreed-on rule to a server.

In an implementation, the second preset field is a field composed of a preset quantity of bytes in a payload area of the service message.

In an implementation, the editing unit is further configured to: put additional information in a third preset field of the service message according to the rule agreed-on with the defending apparatus, where the additional information is a difference between time when the device transmits the service message and a standard time; and select the preset quantity of bytes in the payload area of the service message by: calculating a remainder of the difference divided by a length of the payload area; determining whether a sum of the remainder and the preset number is more than the length of the payload area; and when the sum of the remainder and the preset number is more than the length of the payload area, selecting the preset quantity of bytes starting from a start position of the payload area; or when the sum of the remainder and the preset number is equal to or less than the length of the payload area, making an offset from the start position of the payload area by a plurality of bytes, the quantity of which is the remainder, and selecting the preset quantity of bytes starting from the offset position.

In an implementation, the processing unit is further configured to: determine a result of a logical XOR operation on the information carried in the second preset field and the preset key as the hash value. A length of the second preset field is two bytes, and a length of the preset key is two bytes.

An embodiment of the disclosure further provides a client including any one of the devices according to the tenth embodiment.

The method, device, client and apparatus for defending against distributed denial of service attacks to the embodiments of the disclosure have the following advantageous effects: the defending apparatus obtains the information carried in the first preset field, the inherent information carried in the inherent field and the additional information carried in the at least one second preset field of the service message according to the rule agreed on with the client, processes the inherent information and the additional information according to the hash algorithm agreed on with the client, compares the hash value with the information carried in the first preset field, and determines whether to discard the service message according to the comparison result, as such, the purpose of defending against DDOS attacks is achieved; and comparing with the existing method for defending against DDOS attacks by analyzing characteristics of various service messages automatically through statistics and machine learning, in the embodiment of the disclosure, since the defending apparatus and the client agree on the rule and the hash algorithm in advance, it is not needed to analyze characteristics of various service messages, thus lowering implementation complexity and a probability of discarding a non-attack message (a normal message).

The disclosure has been described in a flow chart and/or a block diagram of the method, the apparatus (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing apparatus to produce a machine so that the instructions executed on the computer or the processor of the other programmable data processing apparatus create means for performing the functions specified in the flow(s) of the flow chart and/or the block(s) of the block diagram.

These computer program instructions can also be stored into a computer readable memory capable of directing the computer or the other programmable data processing apparatus to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing apparatus so that a series of operational operations are performed on the computer or the other programmable data processing apparatus to create a computer implemented process so that the instructions executed on the computer or the other apparatus provide operations for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for defending against distributed denial of service attacks, comprising:
    intercepting, by a defending device, a service message transmitted by a client to a server;
    obtaining, by the defending device, information carried in a first preset field of the service message and information carried in a second preset field of the service message according to a rule agreed on with the client;
    processing, by the defending device, the information carried in the second preset field and a preset key according to a hash algorithm agreed on with the client, and obtaining a first hash value; and
    discarding, by the defending device, the service message upon determining that the first hash value is different from the information carried in the first preset field,
    wherein the information carried in the first preset field is a second hash value obtained by the client by processing the information carried in the second preset field and the preset key according to the hash algorithm, and the second preset field is a field composed of a preset quantity of bytes in a payload area of the service message,
    wherein the method further comprises:
    obtaining, by the defending device, additional information carried in a third preset field of the service message according to the rule agreed on with the client, wherein the additional information is a difference between time when the client transmits the service message and a standard time; and selecting, by the defending device, the preset quantity of bytes in the payload area of the service message by:
calculating, by the defending device, a remainder of the difference divided by a length of the payload area;
determining, by the defending device, whether a sum of the remainder and a preset number is more than the length of the payload area; and
when the sum of the remainder and the preset number is more than the length of the payload area, selecting, by the defending device, the preset quantity of bytes starting from a start position of the payload area; or
when the sum of the remainder and the preset number is equal to or less than the length of the payload area, making, by the defending device, an offset from the start position of the payload area by a plurality of bytes, the quantity of which is the remainder, and selecting the preset quantity of bytes starting from the offset position.

2. The method according to 1, further comprising:
subtracting, by the defending device, a difference in a preceding service message transmitted by the client from the difference in the service message to obtain a temporal difference upon determining that the first hash value is the same as the information carried in the first preset field;
determining, by the defending device, whether the temporal difference lies in a preset range; and
when the temporal difference lies in the preset range, forwarding, by the defending device, the service message to the server; or
when the temporal difference does not lie in the preset range, discarding, by the defending device, the service message.

3. The method according to claim 1, wherein processing, by the defending device, the information carried in the second preset field and the preset key according to the hash algorithm agreed on with the client, and obtaining the first hash value comprises:
determining, by the defending device, a result of a logical XOR operation on the information carried in the second preset field and the preset key as the first hash value, wherein a length of the second preset field is two bytes, and a length of the preset key is two bytes.

4. The method according to claim 1, further comprising:
processing, by the client, the information carried in the second preset field of the service message and the preset key according to the hash algorithm agreed on with the defending device, and obtaining the second hash value;
putting, by the client, the second hash value into the first preset field of the service message according to the rule agreed on with the defending device; and
transmitting, by the client, the service message processed under the agreed-on rule to the server.

5. The method according to claim 4, further comprising:
putting, by the client, the additional information in the third preset field of the service message according to the rule agreed-on with the defending device; and
selecting, by the client, the preset quantity of bytes in the payload area of the service message by:
calculating, by the client, the remainder of the difference divided by the length of the payload area;
determining, by the client, whether the sum of the remainder and the preset number is more than the length of the payload area; and
when the sum of the remainder and the preset number is more than the length of the payload area, selecting, by the client, the preset quantity of bytes starting from the start position of the payload area; or
when the sum of the remainder and the preset number is equal to or less than the length of the payload area, making, by the client, the offset from the start position of the payload area by a plurality of bytes, the quantity of which is the remainder, and selecting the preset quantity of bytes starting from the offset position.

6. The method according to claim 4, wherein processing, by the client, the information carried in the second preset field of the service message and the preset key according to the hash algorithm agreed on with the defending device, and obtaining the second hash value comprises:
determining, by the client, a result of a logical XOR operation on the information carried in the second preset field and the preset key as the second hash value, wherein a length of the second preset field is two bytes, and a length of the preset key is two bytes.

7. A device for defending against distributed denial of service attacks, the device comprising:
a processor; and
a memory storing at least one instruction, wherein the processor is configured to execute the at least one instruction to:
intercept a service message transmitted by a client to a server;
obtain information carried in a first preset field of the service message and information carried in a second preset field of the service message according to a rule agreed on with the client;
process the information carried in the second preset field and a preset key according to a hash algorithm agreed on with the client, and obtain a first hash value; and
discard the service message upon determining that the first hash value is different from the information carried in the first preset field,
wherein the information carried in the first preset field is a second hash value obtained by the client by processing the information carried in the second preset field and the preset key according to the hash algorithm, and the second preset field is a field composed of a preset quantity of bytes in a payload area of the service message,
wherein the processor is further configured to execute the at least one instruction to:
obtain additional information carried in a third preset field of the service message according to the rule agreed on with the client, wherein the additional information is a difference between time when the client transmits the service message and a standard time; and
select the preset quantity of bytes in the payload area of the service message by:
calculating a remainder of the difference divided by a length of the payload area;
determining whether a sum of the remainder and a preset number is more than the length of the payload area; and
when the sum of the remainder and the preset number is more than the length of the payload area, selecting the preset quantity of bytes starting from a start position of the payload area; or when the sum of the remainder and the preset number is equal to or less than the length of the payload area, making an offset from the start position of the payload area by a plurality of bytes, the quantity of which is the remainder, and selecting the preset quantity of bytes starting from the offset position.

8. The device according to claim 7, further comprising a transmitter, wherein the processor is further configured to execute the at least one instruction to:

subtract a difference in a preceding service message transmitted by the client from the difference in the service message to obtain a temporal difference upon determining that the first hash value is the same as the information carried in the first preset field;

determine whether the temporal difference lies in a preset range; and when the temporal difference lies in the preset range, control the transmitter to forward the service message to the server; or when the temporal difference does not lie in the preset range, discard the service message.

9. The device according to claim 7, wherein the processor is further configured to execute the at least one instruction to:

determine a result of a logical XOR operation on the information carried in the second preset field and the preset key as the first hash value, wherein a length of the second preset field is two bytes, and a length of the preset key is two bytes.

10. A device for defending against distributed denial of service attacks, comprising:

a transmitter;

a processor; and a memory storing at least one instruction, wherein the processor is configured to execute the at least one instruction to:

process information carried in a second preset field of a service message and a preset key according to a hash algorithm agreed on with a defending apparatus, and obtain a hash value;

put the hash value into a first preset field of the service message according to a rule agreed on with the defending device; and control the transmitter to transmit the service message processed under the agreed-on rule to a server, wherein the second preset field is a field composed of a preset quantity of bytes in a payload area of the service message, wherein the processor is further configured to execute the at least one instruction to:

put additional information in a third preset field of the service message according to the rule agreed-on with the defending apparatus, wherein the additional information is a difference between time when the device transmits the service message and a standard time; and select the preset quantity of bytes in the payload area of the service message by:

calculating a remainder of the difference divided by a length of the payload area;

determining whether a sum of the remainder and a preset number is more than the length of the payload area; and when the sum of the remainder and the preset number is more than the length of the payload area, selecting the preset quantity of bytes starting from a start position of the payload area; or when the sum of the remainder and the preset number is equal to or less than the length of the payload area, making an offset from the start position of the payload area by a plurality of bytes, the quantity of which is the remainder, and selecting the preset quantity of bytes starting from the offset position.

11. The device according to claim 10, wherein the processor is further configured to execute the at least one instruction to:

determine a result of a logical XOR operation on the information carried in the second preset field and the preset key as the hash value, wherein a length of the second preset field is two bytes, and a length of the preset key is two bytes.

* * * * *